July 28, 1925.
F. A. HANSON
TURF EDGER
Filed Oct. 11, 1923
1,547,386
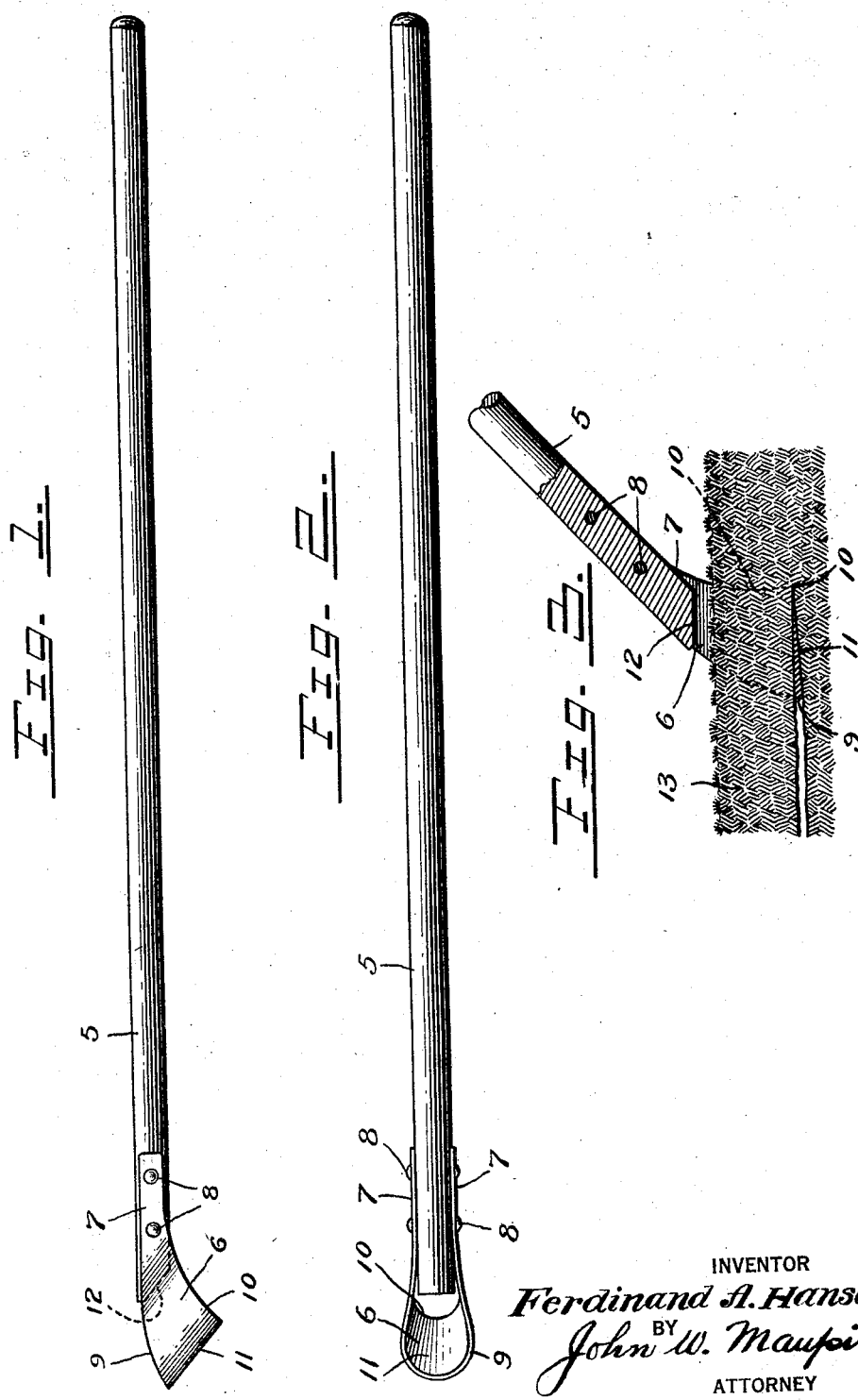
INVENTOR
Ferdinand A. Hanson
BY John W. Maupin
ATTORNEY Patented July 28, 1925.

1,547,386

UNITED STATES PATENT OFFICE.

FERDINAND A. HANSON, OF SEATTLE, WASHINGTON.

TURF EDGER.

Application filed October 11, 1923. Serial No. 667,847.

*To all whom it may concern:*

Be it known that I, FERDINAND A. HANSON, a citizen of the United States, residing at Seattle, in the county of King and State of Washington, have invented a new and useful Turf Edger, of which the following is a specification.

My invention relates to improvements in turf edgers and the principal objects of the invention are to provide a turf edger that is substantial and durable in construction, simple and comparatively inexpensive to manufacture, efficient and reliable in operation, and by means of which the work of edging a lawn may be done more rapidly and with comparatively less effort.

With the above and other objects in view which will appear as the description proceeds, the invention consists of the novel construction, adaptation, arrangement and combination of parts hereinafter described and claimed. These objects are accomplished by devices illustrated in the accompanying drawings, wherein—

Figure 1 is a view in side elevation of a turf edger embodying the features of the invention;

Fig. 2 is a top plan view of the same; and

Fig. 3 is a fragmentary view in vertical section showing the application of the device.

Referring to the drawings throughout which like reference numerals designate like parts, the numeral 5 designates the handle and the numeral 6 designates the blade as a whole. Said blade is substantially U shaped and its arms 7 are secured to said handle by means of suitable fastenings 8.

The blade 6 has a comparatively thick back 9 which narrows to a forward cutting edge 10. Said blade is widest at its bottom portion 11 between said back and cutting edge from whence it curves inwardly and narrows to a joinder with the arms 7 as clearly shown in Figs. 1 and 3 of the drawings.

Referring to Fig. 3 of the drawings it will be noted that the bottom portion 11 of the blade 6 is substantially parallel with the bottom beveled end 12 of the handle 5 for reasons which will presently be apparent. It will likewise be observed that said bottom portion, in its operative position, is substantially horizontal and parallel with the surface of the ground, while said handle is slanted sufficiently to meet the manual convenience of the average operator.

In the application of the device it is merely necessary for the operator to draw the blade toward him after having started and it will be obvious that the work of edging a lawn may thus be accomplished more rapidly and with less expense of effort than with any device used as a spade. The strip of turf, designated by the numeral 13 in Fig. 3, will pass through the loop of the blade and may be broken off at any desired time by tilting the handle 5 backwards.

Another advantage in the use of the device is that the entire operation of edging a lawn may be done without the inconvenience of stooping. The strip of turf 13 may be lifted at any time by the loop of the blade and thrown aside. In case an obstruction is encountered, such as a small stone, same may be extricated and shoveled out of the way by means of the back 9 as will be readily understood.

The preferred embodiment of the invention is disclosed in the drawings and set forth in the specification, but it will be understood that modifications within the scope of the claim may be made in the construction without departing from the principle of the invention or sacrificing any of its advantages.

Having thus described my invention, what I claim and desire to secure by Letters Patent is:—

A turf edger comprising a handle having a beveled lower end, a looped blade secured at both of its ends to said end, an inwardly curved forward cutting edge for said blade, an inwardly curved relatively thick back, a relatively wide bottom blade portion, said bottom portion substantially parallel with said beveled handle end, and said handle slantingly disposed with respect to said bottom blade portion.

FERDINAND A. HANSON.